United States Patent
Lazuka et al.

(10) Patent No.: US 12,487,862 B2
(45) Date of Patent: Dec. 2, 2025

(54) CONFIGURATION AND OPTIMIZATION OF A SOURCE OF COMPUTERIZED RESOURCES

(71) Applicant: International Business Machines Corporation, Armonk, NY (US)

(72) Inventors: Malgorzata Lazuka, Zurich (CH); Thomas Parnell, Zurich (CH); Andreea Anghel, Adliswil (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 17/650,136

(22) Filed: Feb. 7, 2022

(65) Prior Publication Data
US 2023/0251907 A1     Aug. 10, 2023

(51) Int. Cl.
*G06F 9/50*     (2006.01)
*G06F 9/445*    (2018.01)

(52) U.S. Cl.
CPC ........ *G06F 9/5055* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 9,720,738 B2 | 8/2017 | Anghel | |
| 2016/0132787 A1 | 5/2016 | Drevo | |
| 2019/0311394 A1* | 10/2019 | Kveton | G06Q 30/0242 |

(Continued)

FOREIGN PATENT DOCUMENTS

WO    2020150570 A1    7/2020

OTHER PUBLICATIONS

Hoffman, Matthew W., et al. Exploiting Correlation and Budget Constraints in Bayesian Multi-Armed Bandit Optimization, Nov. 11, 2013, arxiv.org/pdf/1303.6746.pdf. (Year: 2013).*

(Continued)

*Primary Examiner* — Wynuel S Aquino
*Assistant Examiner* — Jordan Scott Motter
(74) *Attorney, Agent, or Firm* — Randy Tejeda

(57) ABSTRACT

The invention is notably directed to a computer-implemented method, which aims at jointly identifying an optimal source of computerized resources and optimizing a configuration of the computerized resources. The method comprises configuring a Best-Arm Identification algorithm, in order to (i) associate arms of the algorithm with respective sources of computerized resources and (ii) connect the arms to one or more optimizers. Each of the optimizers is designed to optimize a configuration of such computerized resources. Next, the method iteratively executes the Best-Arm Identification algorithm to progressively eliminate the sources, with a view to eventually identifying one of the sources as an optimal source with an optimized configuration. Several iterations are accordingly performed. During each iteration, each of the arms is pulled and the rewards earned by pulling the arms are computed. Pulling each arm causes to optimize a configuration of computerized resources of a respectively associated source.

20 Claims, 4 Drawing Sheets

(56) References Cited

U.S. PATENT DOCUMENTS

2020/0125586 A1     4/2020    Rezaeian
2021/0097350 A1     4/2021    Theocharous

OTHER PUBLICATIONS

"Multicloud", By: IBM Cloud Education, Aug. 9, 2021, 8 pages, <https://www.ibm.com/cloud/learn/multicloud>.

Bilal et al., "Do the Best Cloud Configurations Grow on Trees? An Experimental Evaluation of Black Box Algorithms for Optimizing Cloud Workloads", Proceedings of the VLDB Endowment, vol. 13, No. 11, 2020, DOI: https://doi.org/10.14778/3407790.3407845, 13 pages.

Chen et al., "FrugalML: How to Use ML Prediction APIs More Accurately and Cheaply", 34th Conference on Neural Information Processing Systems (NeurIPS 2020), 12 pages.

Hutter et al., "Sequential Model-Based Optimization for General Algorithm Configuration", Downloaded Jan. 28, 2022, 15 pages, <https://ml.informatik.uni-freiburg.de/papers/11-LION5-SMAC.pdf>.

Li et al., "Efficient Automatic CASH via Rising Bandits", arXiv:2012.04371v1 [cs.LG] Dec. 8, 2020, 10 pages.

Li eta I., "Hyperband: A Novel Bandit-Based Approach to Hyperparameter Optimization", arXiv:1603.06560v4 [cs.LG] Jun. 18, 2018, 52 pages.

Liu et al., "An ADMM Based Framework for AutoML Pipeline Configuration", arXiv:1905.00424v5 [cs.LG] Dec. 6, 2019, 30 pages.

Mariani et al., "Predicting Cloud Performance for HPC Applications: a User-oriented Approach", @ 2017 IEEE, DOI 10.1109/CCGRID.2017.11, 10 pages.

Rakotoarison, "Automated Machine Learning with Monte-Carlo Tree Search", Downloaded Jan. 28, 22, 8 pages, <https://www.ijcai.org/proceedings/2019/0457.pdf>.

Sarigiannis et al., "Weighted Sampling for Combined Model Selection and Hyperparameter Tuning", arXiv:1909.07140v3 [cs.LG] Nov. 21, 2019, 9 pages.

Anonymous, "What can multi-cloud configuration learn from AutoML?", Submitted to 35th Conference on Neural Information Processing Systems (NeurIPS 2021), Grace Period Disclosure, 16 pages.

Anonymous, "What Can Multi-Cloud Configuration Learn From Automl?", Under review as a conference paper at ICLR 2022, Grace Period Disclosure, 19 pages.

* cited by examiner

CONFIGURATION AND OPTIMIZATION OF A SOURCE OF COMPUTERIZED RESOURCES

STATEMENT REGARDING PRIOR DISCLOSURES BY THE INVENTOR OR A JOINT INVENTOR

The following disclosures are submitted under 35 U.S.C. 102(b)(1)(A):

DISCLOSURE 1: What can multi-cloud configuration learn from AutoML?, Lazuka, Malgorzata; Parnell, Thomas; Anghel, Andreea; Pozidis, Charalampos, May 28, 2021, Pages 1-16, submitted Anonymously to NeurIPS 2021 Conference.

DISCLOSURE 2: What can multi-cloud configuration learn from AutoML?, Lazuka, Malgorzata; Parnell, Thomas; Anghel, Andreea; Pozidis, Charalampos, Oct. 6, 2021, Pages 1-19, submitted Anonymously to ICLR 2022 Conference.

BACKGROUND

The invention relates in general to the field of computer-implemented methods and computer program products for jointly identifying an optimal source of computerized resources and optimizing a configuration of such computerized resources. In particular, it is directed to methods aiming at jointly identifying a cloud provider and optimizing cloud computing resources.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the services. Thus, users can have access to computerized resources, especially data storage and computing power, with minimal management effort. A cloud provider is a company that delivers cloud computing based services.

SUMMARY

According to a first aspect, the present invention is embodied as a computer-implemented method, which aims at jointly identifying an optimal source of computerized resources and optimizing a configuration of the computerized resources. The method comprises configuring a Best-Arm Identification algorithm, in order to (i) associate arms of the algorithm with respective sources of computerized resources and (ii) connect the arms to one or more optimizers. Each of the optimizers is designed to optimize a configuration of such computerized resources. Next, the method iteratively executes the Best-Arm Identification algorithm to progressively eliminate the sources, with a view to eventually identifying one of the sources as an optimal source with an optimized configuration. Several iterations are accordingly performed. During each iteration, each of the arms is pulled and the rewards earned by pulling the arms are computed. Pulling each arm causes to optimize a configuration of computerized resources of a respectively associated source, via a connected optimizer. The rewards earned by pulling the arms are computed based on the estimated performance of the configuration as optimized for each arm, at each iteration. Thus, the sources can be progressively eliminated during the successive iterations, based on the computed rewards.

Preferably, exactly one of the remaining sources is eliminated at each iteration. In preferred embodiments, the method further comprises allocating a gradually increasing computational budget at each iteration for optimizing each of the configurations of the computerized resources of the remaining sources. This computational budget may for instance be increased by a multiplicative constant at each iteration.

According to another aspect, the invention is embodied as a computer program product. The computer program product comprises a computer readable storage medium having program instructions embodied therewith. The program instructions are executable by processing means to cause the latter to perform the steps of the above method. In yet another aspect, the invention is embodied as a computer system. The computer system comprises a computer processor, a computer readable storage medium having program instructions embodied therewith for execution by the computer processors.

BRIEF DESCRIPTION OF THE DRAWINGS

These and other objects, features, and advantages, of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of devices or parts thereof, as involved in embodiments. Similar or functionally similar elements in the figures have been allocated the same numeral references, unless otherwise indicated.

Computerized methods, computer program products, and computer systems embodying the present invention will now be described, by way of non-limiting examples.

DETAILED DESCRIPTION OF EMBODIMENTS OF THE INVENTION

The following description is structured as follows. General embodiments and high-level variants are described in section 1. Section 2 addresses particularly preferred embodiments. Section 3 concerns technical implementation details.

1. General Embodiments and High-Level Variants

Figure 1:
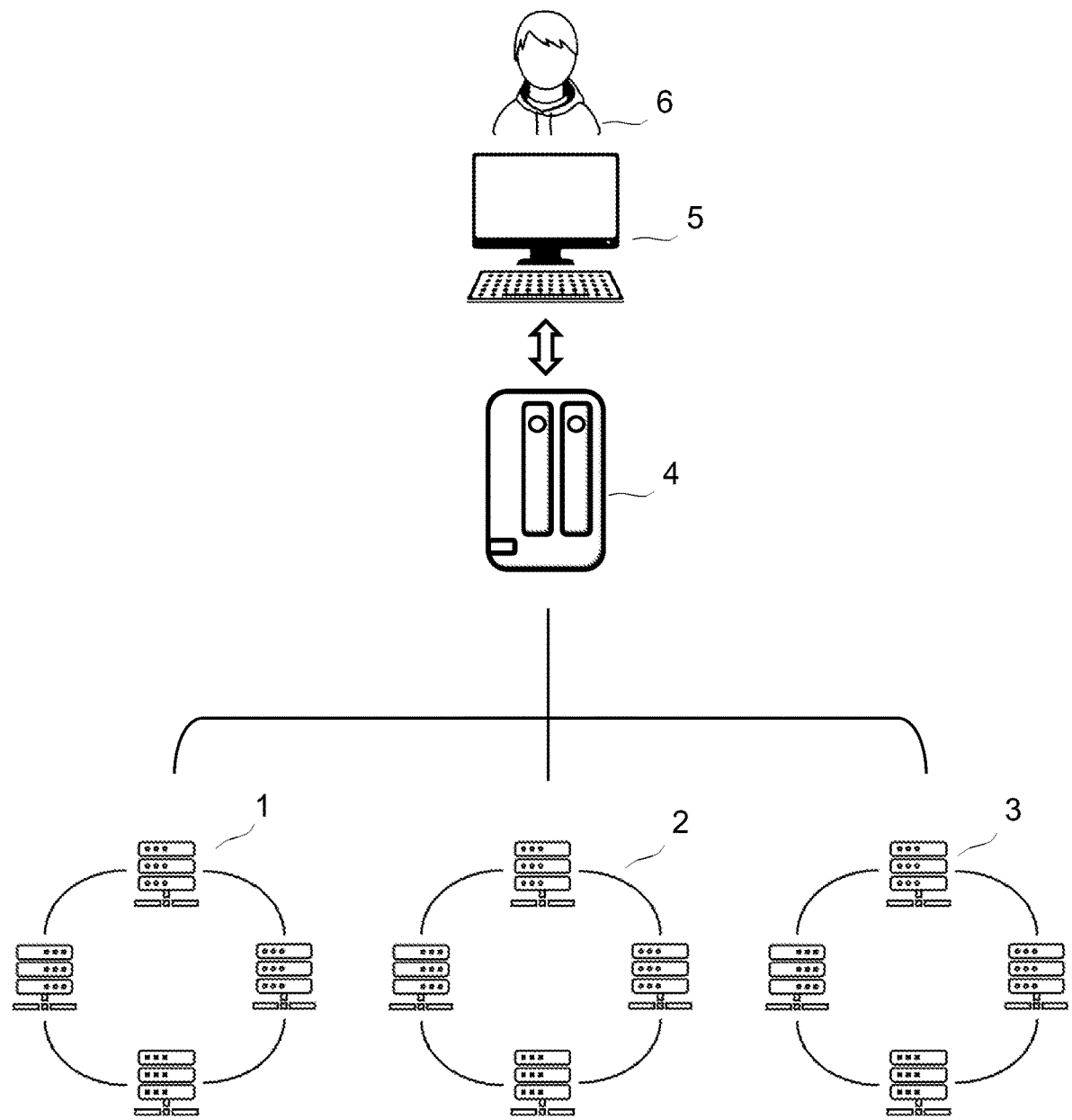
FIG. 1 is a block diagram showing a user interacting with a remote computer with a view to jointly optimizing a cloud provider selection and node configurations, as in embodiments.
Figure 2:
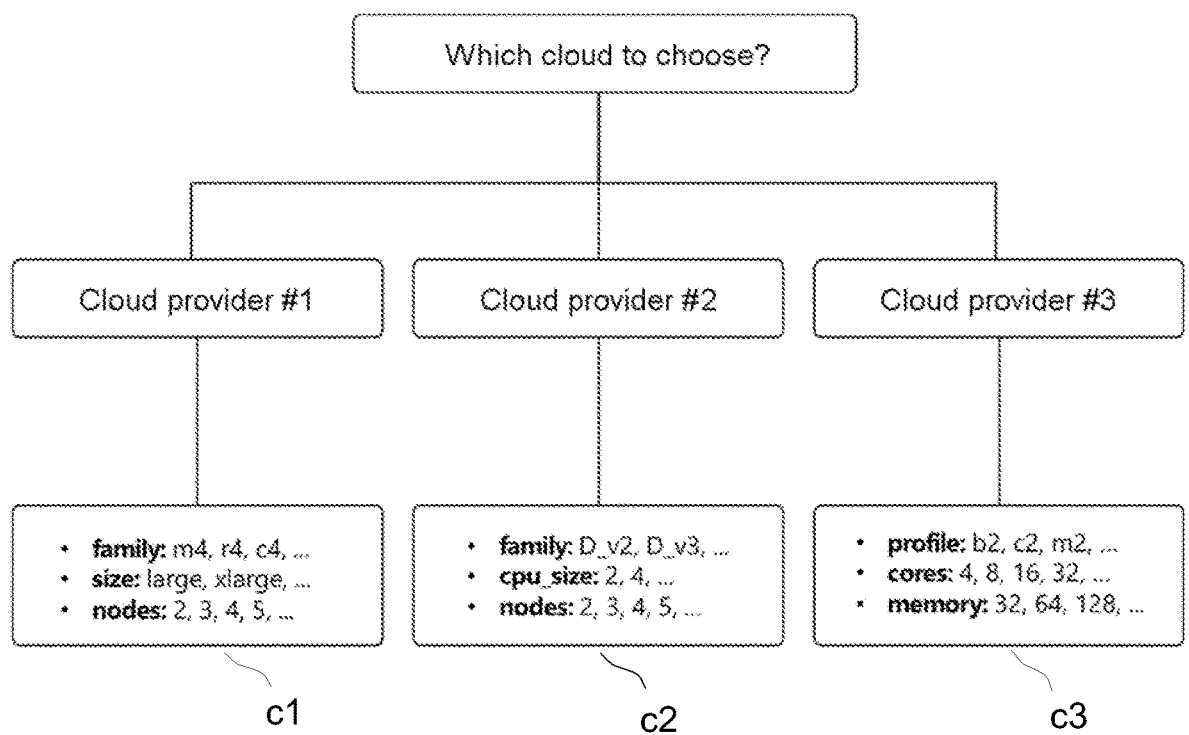
FIG. 2 is a hierarchical diagram illustrating the joint optimization problem to be solved, as in embodiments.
Figure 3:
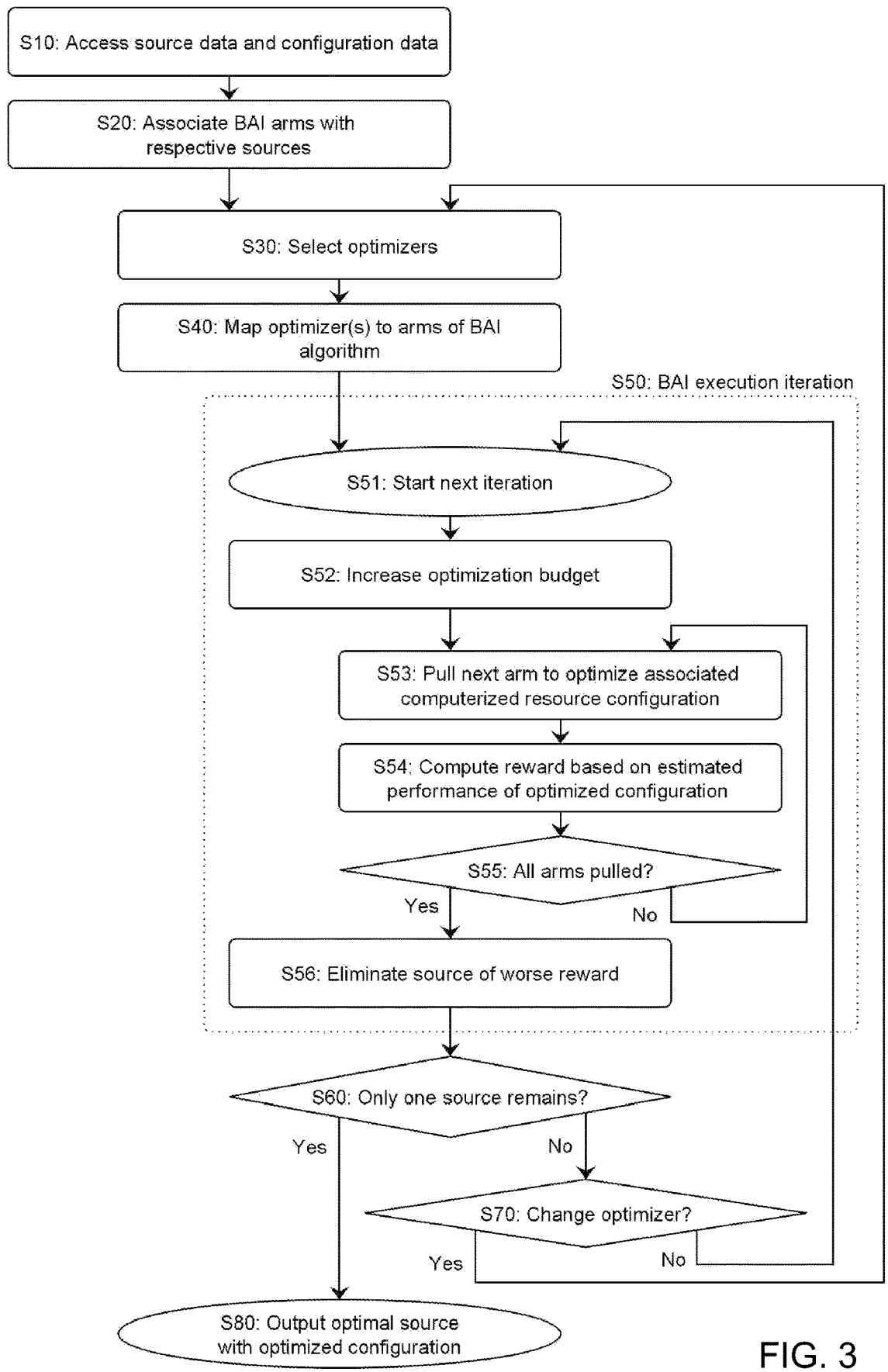
FIG. 3 is a flowchart illustrating high-level steps of an optimization method according to embodiments.

A first aspect of the invention is now described in reference to FIGS. 1-3. This aspect concerns a computer-implemented optimization method. Note, this method and its variants are collectively referred to as the "present methods" in this document. All references Sn refer to methods steps of the flowchart of FIG. 3, while numeral references pertain to devices, components, and concepts involved in embodiments of the present invention.

The aim is to solve is a joint optimization problem, which includes, on the one hand, the identification of an optimal source of computer resources (e.g., a cloud provider) and, on the other hand, the optimization of the configuration of such computerized resources (e.g., the nodes of the cloud). That is, the question to be answered is: "which source to use, and how to best configure the computerized resources?", given that various configuration options may be available for each source. Such configuration options may notably relate to the number of nodes, the virtual machine (VM) family, the number of CPUs or other characteristics of the processing means, as assumed in FIG. 2. Further configuration options may be available, such as options related to memory (e.g., the amount of memory) and execution.

When faced with the problem of node configuration (i.e., when the cloud provider is known), it is common to use black-box optimization (BBO) algorithms such as Bayesian optimization algorithms. These are effective for this application because the configuration is of a small-to-moderate dimensionality. However, users may want to jointly optimize the cloud provider selection and the node configuration. Now, when faced with the joint optimization problem of cloud provider selection and node configuration, BBO approaches are less effective due to the higher dimensionality of the joint selection-configuration space. More generally, a similar problem arises when willing to jointly optimize a source of computerized resources and a configuration of such computerized resources.

Besides, various optimization methods are known, albeit not to specifically solve the above problem. For instance, the multi-armed bandit problem (also known as N-armed bandit problem) relates to situations where a set of resources must be allocated between alternative choices in a way that maximizes their expected gain, where properties pertaining to each choice are only partially known at the time of allocation, though such properties may become better understood over time as further resources are allocated to the various choices. The objective is to maximize the sum of rewards earned through successive lever pulls. A general solution to the multi-armed bandit problem is given by the Multi-Armed Bandit algorithm. A variant to this problem is the Best-Arm Identification (BAI) problem, in which the arm that delivers the best rewards must be identified, whilst minimizing the total number of arm pulls. Various BAI algorithms are known, including the so-called Hyperband, Rising Bandits, and Weighted Sampling algorithms.

The Multi-Armed Bandit algorithm and BAI algorithms evoked above do not specifically aim at solving the present problem, i.e., the joint identification of a source of computerized resources and optimization of the configuration of such resources. However, the present inventors have realized that the Best-Arm Identification (BAI) algorithm can be usefully applied to efficiently solve this problem, provided that arms of the algorithm are suitably mapped onto the problem at issue. They accordingly came to devise a novel method of jointly identifying an optimal source 3 of computerized resources 1, 2, 3 and optimizing a configuration c1, c2, c3 of such computerized resources.

The method basically includes two main steps. The BAI algorithm must be suitably configured, prior to iteratively executing this algorithm to progressively eliminate the potential sources, while optimizing the configurations of the computerized resources. That is, the problem is divided in two simpler sub-problems, which are solved alternatively.

In detail, the BAI algorithm is configured at steps S20-S40 (see the flowchart of FIG. 3), so as to suitably map the arms of the algorithm onto the present problem. The mapping is twofold. First, the arms are associated S30 with respective sources 1, 2, 3 of computerized resources. In addition, the arms are connected S40 to one or more optimizers. That is, each arm is connected to at least one optimizer. The users may for instance be given the possibility to select the optimizers. The optimizers are designed to optimize configurations of computerized resources, such as cloud computing resources. Such optimizers may typically be black-box optimizers (BBOs).

The BAI algorithm is then iteratively executed S50. Executing the BAI algorithm causes to progressively eliminate S56 the sources. The aim is to be able to eventually identify S80 one of the sources 1, 2, 3 as an optimal source, having an optimized configuration. Several iterations are performed, during which each of the arms is pulled and corresponding rewards are computed.

Thanks to the connection performed at step S40, each arm of the BAI algorithm is connected to one or more configuration optimizers, such that pulling an arm amounts to invoking an optimizer, during each iteration. I.e., pulling S53 an arm causes to optimize a configuration c1, c2, c3 of the computerized resources 1, 2, 3 of the respectively associated sources, thanks to the connected optimizer.

During each iteration, the rewards earned by pulling the arms are computed S54 based on an estimated performance of the optimized configurations c1, c2, c3 of the resources of the associated sources. I.e., each of the rewards depends on the estimated performance of the configuration c1, c2, c3 as optimized for each arm. The various sources can thus be progressively eliminated S56 over the course of the iterations, based on the computed rewards.

Note, the above iterative process involves two loops, where an inner loop is nested inside an outer loop. The inner loop causes to pull each of the arms (successively or in parallel), while the outer loop causes to progressively eliminate S56 the candidate sources. The above "iterations" refers to iterations of the outer loops.

The iterative process may possibly be stopped at any time, provided that some termination criterion is met. Thus, more than one source of computerized resources may eventually be identified as optimal sources. This may notably be the case if the selection criterion cannot conclusively decide between two sets of configurations, because their estimated performance is essentially similar. Preferably though, the algorithm attempts to identify a single source as the most optimal source, e.g., the source #3 in the example of FIG. 2, together with an optimal configuration thereof, e.g., a configuration involving the "c2" profile, with 16 cores, and 64 GB memory.

The present approach allows a joint optimization to be achieved, where an optimal source 3 of computerized resources 1, 2, 3 is identified and computerized resources are optimized. In addition, the optimization of the configurations can potentially be improved over the iterations. I.e., the algorithm starts by evaluating a relatively large number of sources and configurations, for which limited optimization is performed, as this optimization involves costly evaluations for each of the sources. Yet, this already allows unsuitable configurations to be discarded with sufficient confidence. As further iterations are performed, the algorithm is faced with an ever smaller number of sources and configurations, which can be further optimized, to allow ever more judicious eliminations.

Of particular interest is the application of the present methods to cloud computing resources and cloud providers, for which optimizers are known to involve particularly costly evaluation function. In such applications, the computerized resources 1, 2, 3 are cloud computing resources, the sources are cloud providers, and the optimizers are designed to optimize a configuration c1, c2, c3 of cloud computing resources that can be provided by the cloud providers, as assumed in FIG. 2.

The iterative algorithm may be designed so as to ensure that at least one of the remaining sources is eliminated S56 at each iteration. Preferably, the algorithm eliminates exactly one of the remaining sources at each iteration, which gives rise to a very simple and robust selection process. The eliminated source is the source for which the optimized configuration has the poorest estimated performance. In practice, eliminating exactly one source at each iteration is considerably simpler than sophisticated heuristics such as proposed in the Rising Bandits algorithm. It is also more practical than eliminating a constant fraction of the remaining arms, as done in the Hyperband and Weighted Sampling algorithms, which, in the present context, would require rounding the number of eliminated sources. All the more, this makes it possible to improve the performance of the final configuration obtained. One reason is that successive eliminations are compatible with most BBOs. Thus, high-performance BBO algorithms can be used to optimize the configurations.

In embodiments, the present methods allocate S52 a gradually increasing computational budget for optimizing each of the configurations c1, c2, c3 of the computerized resources 1, 2, 3 of the sources that remain at each iteration. This way, the quality of the configuration optimizations improves over the iterations. As the present inventors concluded, the most satisfactory trade-off is to increase the computational budget allocated at step S52 by a multiplicative constant, at each iteration. I.e., each optimization step is allocated a computational budget that is multiplied by a constant factor at each iteration. This makes it possible to markedly improve the optimization performance over the iterations, while maintaining an affordable computational workload, all the more so if at least one source is eliminated at each iteration.

Note, this computational budget may for instance be allocated S52 as a maximal number of evaluations allowed for evaluating the performance of the configurations c1, c2, c3. This number is fixed at each iteration and is the same for all sources. However, this number is multiplied by a constant factor at each iteration, e.g., by 2 or 3. For example, a single evaluation may be allowed during the first round, while up to two evaluations are tolerated in the next iteration, and so on. In variants, the computational budget can be set as a maximum time period or a maximal cost, where the cost can be determined according to any suitable performance metric.

In general, the arms may initially be connected to one or more optimizers at step S40. A simple approach is to connect each of the arms to a single optimizer. The same optimizer will accordingly be invoked S53 at each iteration, upon pulling each of the arms. In more sophisticated variants, the arms are connected to distinct optimizers. Thus, different optimizers may be invoked over the iterations, although a same optimizer is invoked by each of the arms during each of the iterations. For example, a first optimizer may be invoked S53 upon pulling each of the arms during the very first iteration, while the second optimizer may be invoked S53 by each arm during a subsequent iteration. Similarly, the present methods may invoke three or more optimizers over the course of the iterations. Optimizers that are the most work-intensive are preferably used during the last iterations, while less demanding optimizers may be used during the initial iterations, to lower the computational burden and speed up the optimization.

The timing to switch from one optimizer to another may be predetermined. For example, a first optimizer may be imposed during the first two iterations, while the second optimizer will be used from the third iteration onward. In variants, the algorithm may decide S70 when to switch from one optimizer to the other at runtime (as assumed in FIG. 3), depending on the complexity of the problem. That is, at each iteration, the algorithm may decide S70 whether to switch from one optimizer to the other, prior to starting the next iteration. The decision may be made in accordance with a number of factors, e.g., the number of remaining sources, the number and/or the complexity of the corresponding configurations, and the computational budget allocated for evaluating the performance of the configurations.

Switching optimizers is well suited if the optimizers do not re-use results from a previous iteration, as is typically the case with black-box optimizers. That is, such optimizers are typically programmed to start each optimization from scratch, at each iteration. However, some optimizers may possibly be programmed, parameterized, or somehow configured, to reuse previous optimization results, at least partly. So, when using such an optimizer, one may prefer to maintain the same optimizer throughout the entire optimization process. In other variants, the algorithm may switch optimizers but maintain a same optimizer during at least two iterations, such that the optimizers may possibly reuse optimization results of a previous iteration (normally the immediately preceding iteration). Combinations may further be contemplated, wherein some of the optimizers always restart from scratch, while others are set to exploit results obtained during a previous iteration. In typical embodiments, though, each optimizer is a black box set to restart from scratch.

Such optimizers may notably be based on a Random Search method, a Bayesian Optimization method, and/or a Radial Basis Function method. For example, the optimizer(s) may be based on the so-called RBFOpt library, which is an open-source library for black-box optimizations involving costly function evaluations.

At each iteration, each of the rewards is preferably computed S54 using a same utility function, where the latter takes the estimated performance of the configuration of the respective resources, as optimized for each arm, as argument. However, the utility function considered may possibly change from one iteration to the other, e.g., depending on the optimizer used at each iteration. The utility function may for instance depend on a cost and/or a runtime estimated for a given computer task to be performed with the configuration c1, c2, c3 as optimized for each arm. The estimated runtime (for a given task) is a good example of performance metric. Note, the computer task, on which is based the utility function, may possibly be an on-going task. In that case, the utility function cannot depend on runtime. However, other performance metrics can be used, e.g., reflecting a cost. The estimation of such a cost (including the financial cost) will typically depend on the estimated performance that can be achieved by the optimized configuration. That is, the cost can typically be estimated according to the estimated performance and the utility function can be a function of this cost.

Next, according to another aspect, the invention is embodied as a computer program product. Consistently with the present methods, the computer program product aims at jointly identifying an optimal source of computerized resources and optimizing a configuration of such computerized resources. The computer program product comprises a computer readable storage medium having program instructions embodied therewith.

Figure 4:
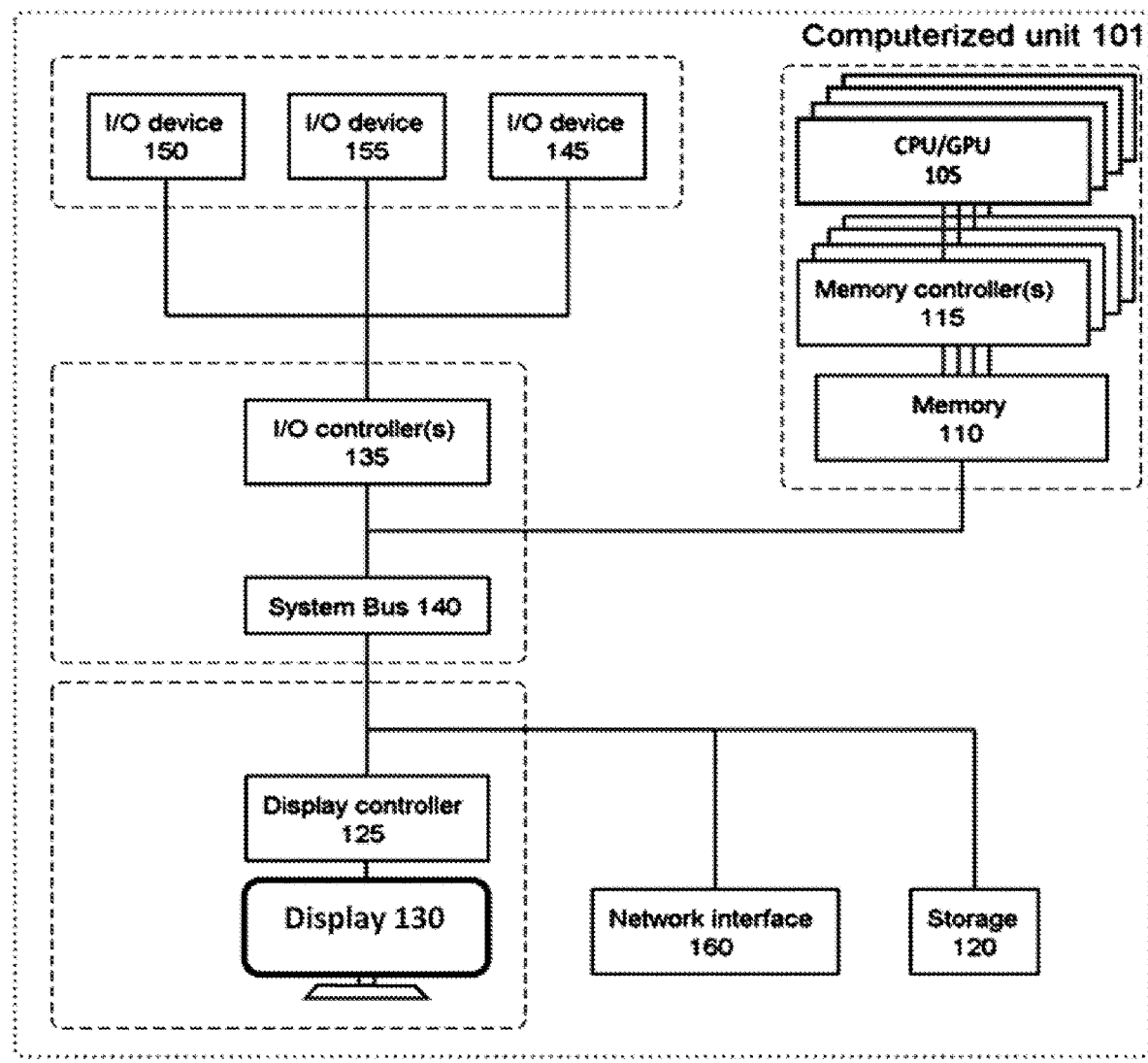
FIG. 4 schematically represents a general-purpose computerized unit, suited for implementing one or more method steps as involved in embodiments of the invention.

Such instructions typically form a software, e.g., stored in the storage 120 of a computerized unit 101 such as shown in FIG. 4. The program instructions can be executed by processing means 105 of such a unit 101, to cause the latter to perform steps according to the present methods.

In particular, the program instructions may be specifically designed for optimizing configurations of cloud computing resources 1, 2, 3 and identifying an optimal cloud provider, based on optimizers such as described earlier.

The computerized system 4 used to perform the steps of the present methods may possibly consist of a single computer, as assumed in FIG. 1. More generally, the computerized system used to implement the present methods may include one or more computerized units 101 such as shown in FIG. 4. E.g., steps of the present methods may possibly be performed thanks to a network of interconnected computerized units 101. Additional aspect of computerized systems and computer program products are described in section 3.

Next, according to another aspect, the invention is embodied as a computer system. Consistently with the present methods, the computer program system aims at jointly identifying an optimal source of computerized resources and optimizing a configuration of such computerized resources. The computer program system comprises a computer processor, a computer readable storage medium having program instructions embodied therewith, and the program instructions for processing by the computer processors.

The above embodiments have been succinctly described in reference to the accompanying drawings and may accommodate a number of variants. Several combinations of the above features may be contemplated. Examples are given in the next section.

2. Particularly Preferred Embodiments 2.1 Preferred Applications

Assume that a customer 6 has a workload that they would like to run in a cloud 1, 2, 3. This workload needs to be run repeatedly. For example, the workload required to retrain a recommendation engine (based on a machine learning model) every 2 hours. The training may also be distributed across multiple cloud instances, e.g., using Kubernetes. Now, some platforms give customers the possibility to run their workload across multiple cloud providers. Additionally, each cloud provider may offer various configuration options (e.g., related to the number of nodes, the VM family, the number of CPUs, the amount of memory, etc.).

Typically, the customer 6 wishes to minimize either the runtime or the total cost. With this goal in mind, the customer must decide which cloud provider to use and, given a cloud provider, how to best configure the cloud computing resources, starting with the node configuration. The optimization of the cloud resource configuration is not an issue, provided that the cloud provider is known. As said, various BBO algorithms are available, which can be used to that aim. However, when faced with the joint optimization problem of cloud provider selection and resource configuration, BBO approaches are less effective due to the increased dimensionality of the joint selection-configuration space, as noted earlier.

Now, this joint optimization problem can advantageously be split into two simpler subproblems: one for the cloud provider selection, and one for node configuration, which are solved in an iterative (and alternating) fashion, as explained in section 1. That is, a BAI approach is used, wherein each arm corresponds to a given cloud provider, and pulling each arm may cause to perform a number of optimization steps on the configuration sub-problem for a specific cloud. Any BBO algorithm can be used for optimization. The reward for pulling each arm is the lowest runtime or cost found so far for the corresponding cloud provider. Initially, the algorithm constructs a set of active arms, one for each cloud provider. The algorithm then proceeds in an iterative fashion: it pulls the arms in the active set in each round, and eliminate exactly one arm, the one having the worst reward.

For example, the customer 6 may interact with a server 4, using a personal device 5. The joint optimization may be performed at the server 4, which accesses data from various sources 1, 2, 3 to perform this optimization, as illustrated in FIG. 1. Once an optimal source (e.g., source 3) and an optimized configuration of resources have been obtained, the customer 6 may instruct to execute their workload at the identified source, with the optimized resource configuration.

2.2 Preferred flows of operations

FIG. 3 shows a high-level flow of operations according to preferred embodiments. First, data are accessed at step S10. Such data concerns potential sources (e.g., cloud providers) and possible configurations of the corresponding computerized resources (e.g., cloud computing resources). Next, the BAI algorithm is configured through a series of steps S20-S40. The arms of the algorithm are associated with respective sources at step S20. One or more optimizers are selected at step S30 and the selected optimizers are mapped S40 onto the BAI arms. The BAI algorithm is then executed S50 iteratively. Each iteration starts at step S51. The computational budget for the optimization is set at step S52. This budget is increased (e.g., by a constant factor) at each subsequent iteration. A further loop is started at step S53, whereby each arm is iteratively pulled to optimize the configuration of computerized resources of the associated source. At step S54, the performance of the optimized configuration obtained is estimated, in order to accordingly compute a reward for each pull. Steps S53 and S54 are iteratively performed (possibly in parallel) for each arm. Once all of the arms have been pulled (S55: Yes), the algorithm eliminates S56 the source that has received the worst reward. Steps S51-S56 are repeated until a single source remains. Note, the algorithm may optionally consider S70 changing optimizers at each iteration S70. If so (S70: Yes), the next iteration is performed according to a distinct optimizer. Eventually, only one source remains (S60: Yes), and the algorithm outputs S80 the optimal source identified, together with an optimized configuration of the corresponding resources.

3. Technical implementation details 3.1 Computerized units

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly-interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

For instance, the present methods may be performed using one or more computerized units 101 (e.g., general- or specific-purpose computers) such as shown in FIG. 4. Each unit 101 may interact with other, typically similar units 101, to perform steps according to the present methods.

In exemplary embodiments, in terms of hardware architecture, as shown in FIG. 4, each unit 101 includes at least one processor 105, and a memory 110 coupled to a memory controller 115. Several processors (CPUs, and/or GPUs) may possibly be involved in each unit 101. To that aim, each CPU/GPU may be assigned a respective memory controller, as known per se.

One or more input and/or output (I/O) devices 145, 150, 155 (or peripherals) are communicatively coupled via a local input/output controller 135. The I/O controller 135 can be coupled to or include one or more buses and a system bus 140, as known in the art. The I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software, including instructions such as coming as part of computerized tasks triggered by machine learning algorithms. The processors 105 can be any custom made or commercially available processor(s). In general, they may involve any type of semiconductor-based microprocessor (in the form of a microchip or chip set), or more generally any device for executing software instructions, including quantum processing devices.

The memory 110 typically includes volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 4, instructions loaded in the memory 110 may include instructions arising from the execution of the computerized methods described herein in accordance with exemplary embodiments. The memory 110 may further load a suitable operating system (OS) 111. The OS 111 essentially controls the execution of other computer programs or instructions and provides scheduling, I/O control, file and data management, memory management, and communication control and related services.

Possibly, a conventional keyboard and mouse can be coupled to the I/O controller 135. Other I/O devices 140-155 may be included. The computerized unit 101 can further include a display controller 125 coupled to a display 130. The computerized unit 101 may also include a network interface or transceiver 160 for coupling to a network (not shown), to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

3.2 Computer Program Products

The present invention may be a method, and/or a computer program product. The computer program product may include a computer readable storage medium (or media) having computer readable program instructions thereon for causing processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Go, Python, Ruby, Scala, Swift, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

3.3 Clouds

It is to be understood that although this disclosure refers to embodiments involving cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for jointly identifying an optimal source of computerized resources and optimizing a configuration of the computerized resources, the method comprising:

configuring a Best-Arm Identification algorithm that associates each arm of one or more arms of the algorithm with a computerized resource of one or more computerized resources and connecting each arm of the one or more arms to an optimizer of one or more optimizers, wherein a selection of the one or more optimizers to connect to each arm is based on a design of the one or more optimizers, wherein each optimizer of the one or more optimizers is designed to optimize a computerized resource of the one or more computerized resources, and iteratively executing the Best-Arm Identification algorithm, wherein during each iteration a computerized resource of the one or more computerized resources is removed until an optimal source of the one or more computerized resources remains, wherein each iteration increases a maximal number of evaluations at each iteration, each iteration of said iterations comprising:

pulling each arm of the one or more arms via the connected optimizer using the associated computerized resource, wherein the connected optimizer is constrained by the maximal number of evaluations; and computing a reward earned by pulling each arm of the one or more arms, wherein each reward depends on an estimated performance based on the optimizer, whereby the computerized resources associated with each arm of the one or more arms are progressively eliminated throughout the iterations based on the rewards.

2. The method according to claim 1, wherein two or more computerized resources of the one or more computerized resources is eliminated at each iteration.

3. The method according to claim 1, wherein one computerized resource of the one or more computerized resources is eliminated at said each iteration, the one computerized resource having a lowest reward.

4. The method according to claim 1, wherein the one or more optimizers are a single type of optimizer.

5. The method according to claim 1, wherein the one or more optimizers are selected from the group consisting of a first optimizer and a second optimizer, wherein the first optimizer is used during a first iteration, and wherein the second optimizer is used during a subsequent one or more iterations after the first iteration.

6. The method according to claim 1, wherein the method further comprises deciding, prior to starting a next one of the iterations, whether to switch from a first optimizer to a second optimizer based on one or more of a number of remaining sources, a number of corresponding configurations, a complexity of corresponding configurations, and an allocated computational budget.

7. The method according to claim 1, wherein at least one of the optimizers is a black-box optimizer.

8. The method according to claim 1, wherein the one or more optimizers are selected from the group consisting of a Random Search, a Bayesian Optimization, and a Radial Basis Function method.

9. The method according to claim 1, wherein one of the one or more optimizers is a RBFOpt algorithm.

10. The method according to claim 1, wherein the computerized resources are cloud computing resources.

11. A computer program product for jointly identifying an optimal source of computerized resources and optimizing a configuration of the computerized resources, the computer program product comprising:

one or more computer readable storage media; and
program instructions stored on the one or more computer readable storage media, the program instructions comprising:
program instructions to configuring a Best-Arm Identification algorithm that associates each arm of one or more arms of the algorithm with a computerized resource of one or more computerized resources and connecting each arm of the one or more arms to an optimizer of one or more optimizers, wherein a selection of the one or more optimizers to connect to each arm is based on a design of the one or more optimizers, wherein each optimizer of the one or more optimizers is designed to optimize a computerized resource of the one or more computerized resources, and
program instructions to iteratively execute the Best-Arm Identification algorithm, wherein during each iteration a computerized resource of the one or more computerized resources is removed until an optimal source of the one or more computerized resources remains, wherein each iteration increases a maximal number of evaluations at each iteration, each iteration of said iterations comprising:
program instructions to pull each arm of the one or more arms via the connected optimizer using the associated computerized resource, wherein the connected optimizer is constrained by the maximal number of evaluations; and
program instructions to compute a reward earned by pulling each arm of the one or more arms, wherein each reward depends on an estimated performance based on the optimizer, whereby the computerized resources associated with each arm of the one or more arms are progressively eliminated throughout the iterations based on the rewards.

12. The computer program product of claim 11, wherein two or more computerized resources of the one or more computerized resources is eliminated at each iteration.

13. The computer program product of claim 11, wherein one computerized resource of the one or more computerized resources is eliminated at said each iteration, the one computerized resource having a lowest reward.

14. The computer program product of claim 11, wherein the one or more optimizers are a single type of optimizer.

15. The computer program product of claim 11, wherein the one or more optimizers are selected from the group consisting of a first optimizer and a second optimizer, and wherein the first optimizer is used during a first iteration, wherein the second optimizer is used during a subsequent one or more iterations after the first iteration.

16. A computer system for jointly identifying an optimal source of computerized resources and optimizing a configuration of the computerized resources, the computer system comprising:

one or more computer processors;
one or more computer readable storage media; and
program instructions, stored on the one or more computer readable storage media for execution by at least one of the one or more computer processors, the program instructions comprising:
configuring a Best-Arm Identification algorithm that associates each arm of one or more arms of the algorithm with a computerized resource of one or more computerized resources and connecting each arm of the one or more arms to an optimizer of one or more optimizers, wherein a selection of the one or more optimizers to connect to each arm is based on a design of the one or more optimizers, wherein each optimizer of the one or more optimizers is designed to optimize a computerized resource of the one or more computerized resources, and
iteratively executing the Best-Arm Identification algorithm, wherein during each iteration a computerized resource of the one or more computerized resources is removed until an optimal source of the one or more computerized resources remains, wherein each iteration increases a maximal number of evaluations at each iteration, each iteration of said iterations comprising:
pulling each arm of the one or more arms via the connected optimizer using the associated computerized resource, wherein the connected optimizer is constrained by the maximal number of evaluations; and
computing a reward earned by pulling each arm of the one or more arms, wherein each reward depends on an estimated performance based on the optimizer, whereby the computerized resources associated with each arm of the one or more arms are progressively eliminated throughout the iterations based on the rewards.

17. The computer system of claim 16, wherein two or more computerized resources of the one or more computerized resources is eliminated at each iteration.

18. The computer system of claim 16, wherein one computerized resource of the one or more computerized resources is eliminated at said each iteration, the one computerized resource having a lowest reward.

19. The computer system of claim 16, wherein the one or more optimizers are a single type of optimizer.

20. The computer system of claim 16, wherein the one or more optimizers are selected from the group consisting of a first optimizer and a second optimizer, and wherein the first optimizer is used during a first iteration, wherein the second optimizer is used during a subsequent one or more iterations after the first iteration.

\* \* \* \* \*